United States Patent Office 3,294,574
Patented Dec. 27, 1966

3,294,574
COATING PLASTIC ARTICLES WITH AN EPOXY-UREA-FORMALDEHYDE FORMULATION
Morris Salame, Windsor, Conn., assignor, by mesne assignments, to Monsanto Company, a corporation of Delaware
No Drawing. Filed Aug. 28, 1962, Ser. No. 220,038.
4 Claims. (Cl. 117—94)

This invention relates to plastic containers provided with a hard, flexible, clear, high gloss, external coating; to the liquid coating composition used to provide the high-gloss coating; and to the process of applying the coating to plastic containers. More specifically, the invention involves a coating composition comprising essentially an epoxy resin as the principal ingredient, a urea-formaldehyde as a cross-linking agent, epoxidized vegetable or animal oil as a flexibilizer, and phosphoric acid compound as a catalyst.

Plastic containers and more particularly flexible bottles made of polymerized olefinic hydrocarbons such as polyethylene have been gaining increasing use as containers for household liquids such as detergents, liquid cosmetics such as various lotions and deodorants and so on. Such plastic containers have gained acceptance largely because of their flexibility and resistance to breakage. However, they have suffered in comparison with similar containers made of glass because the plastic normally has a dull surface which is rather easily scuffed and soiled, and printed matter applied thereto becomes disfigured or even illegible. Because of these effects, merchandise packaged in polyethylene containers tends to become unsightly during shipment or after relatively short time when displayed on store shelves or used in the home. Especially in the case of dark polyethylene bottles, these must often be buffed after shipping to remove scuff marks and to restore the bottles to their intended striking appearance.

Efforts to overcome these shortcomings satisfactorily by applying external coatings to the plastic containers have heretofore failed on several grounds. For instance, some prior coating compositions either were too viscous to permit easy application or were slow curing or both, thus making economical use impractical. Other coating compositions did not produce coatings of the required high gloss, water-clear color, flexibility, clarity, aging characteristics or hardness, while still other compositions required such high curing temperatures as to cause permanent distortion of the plastic container.

It is an object of this invention to provide polyethylene squeeze bottles and similar containers which have an attractive, hard, glossy surface comparable to that of glass or glazed china. A more specific object is to provide an improved coating composition capable of producing a hard, flexible, clear, non-yellowing, high gloss coating characterized by strong adhesion to hydrophillic surfaces such as treated polyethylene. Still another object is to provide such a coating composition which can be applied as a low viscosity fluid but can be cured rapidly and at moderate temperature to provide the desired finish without injury to low melting plastics such as low-density polyethylene. It is also an object to provide a process of applying such compositions, particularly to relatively low melting plastics. A still further object is to provide a process for imparting to dull, opaque polyethylene containers a transparency approaching that of glass. These and other objects, as well as the nature, scope and mode of use of this invention will become more clearly apparent from the following specification.

It has now been discovered that a unique coating possessing the characteristics set forth above can be obtained by use of a coating composition comprising essentially a low viscosity solution of an epoxy polyether resin, a urea-formaldehyde resin, an epoxidized vegetable or animal oil, and a phosphate catalyst. The preferred solvent is methylethyl ketone although other low boiling solvents or solvent systems known to dissolve epoxy resins may be used similarly. Particularly good results are obtained when the coating composition also includes small amounts of a surface tension reducer such as a silicone oil as well as an anti-static agent such as a quaternary ammonium chloride.

The preferred epoxy resins can be obtained by reacting epichlorhydrin with p,p'-dihydroxy diphenyl methane (bisphenol F) or with 3,4-di(parahydroxy benzyl) phenol, and may be represented by the following formulas, respectively:

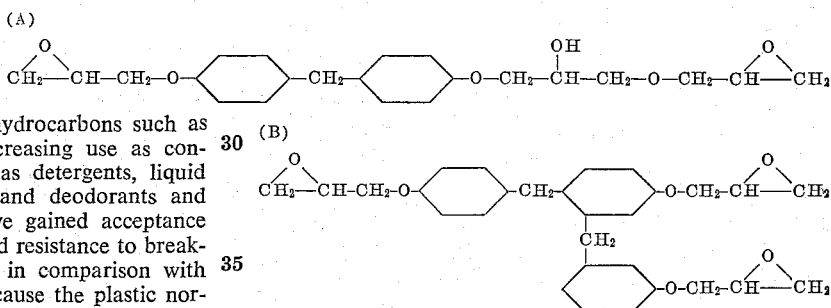

The above resin B, alone or in admixture with other epoxy resins such as resin A, is particularly effective because of its unique trifunctional "trisphenol" structural but known bisphenol-type resins having an epoxide equivalent in the range between about 140 and 400, preferably between about 160 and 200, which are based on condensing a bisphenol with an excess of epichlorhydrin and can be converted to a high molecular weight thermoset plastic by the application of heat, are generally useful also. The useful resins (in 100% concentration) are highly viscous liquids having a viscosity in the range of 20,000 to 30,000 cps. In the uncured state, they are freely soluble in oxygenated solvents such as acetone. Epoxy resins having epoxide values below the above stated range are too low in molecular weight and yield brittle coatings while those above this range yield coatings which are too soft. The epoxide-equivalent is expressed in the trade as the grams of the polymeric resin containing one gram equivalent of epoxide.

A particularly desirable commercial epoxy resin is "ERL-3794," made by Union Carbide Company, which has an epoxide equivalent of about 180 and contains about 28% of the aforesaid trifunctional resin B in combination with resin A or a similar bisphenol-type epoxy. Suitable alternates include ERL-2255 and ERL-2256, GenEpoxy 175, GenEpoxy 190 and Ciba resins 6005 and 502, and the like. They are used in the form of solutions in a ketone solvent as further described below. ERL-2255 is an epoxy resin with an epoxy assay of 156 gr./gr. mol, a viscosity of about 2000 centipoises, a specific gravity of 1.156 and a Gardner color of 3. ERL-2256 is an epoxy resin with an epoxy assay of 140, a viscosity of 500–900 centipoises, a specific gravity of 1.157 and a Gardner color of 3. GenEpoxy 175 is an epoxy resin having an epoxide equivalent of 172 to 176, a maximum viscosity of 6400 centipoises, a maximum Gardner color of 1, a maximum chloride content of 0.25% and a specific gravity of 1.16. GenEpoxy 190 is an epoxy resin having an epoxide equivalent of 187 to 191, a viscosity of 11,000 to 16,000 centipoises, a maximum Gardner color of 4, a maximum chloride content of 0.25%, and a specific gravity of 1.18. Ciba 6005 is an epoxy resin having an epoxy equivalent of 192, an epoxy value of 0.52/100 gr. resin, a viscosity of about 9000 centipoises, a Gardner color of 3, and a specific gravity of 1.16. Ciba 502 is an epoxy resin having an epoxy equivalent of 263, an epoxy value of 0.38/100 gr. resin, a viscosity of about 4500 centipoises, a Gardner color of 7, and a specific gravity of 1.15.

Epoxy resins are too viscous to be used for dip coating at 100% solids. The present invention requires the resins to be used as solutions in a solvent such as MEK to yield a viscosity of 16–18 seconds on a Zahn #2 cup. Coating solutions containing a solids concentration in the range of about 40 to 60%, e.g., 50%, can be formulated to give the proper viscosity. The particular viscosity range just specified is advantageous to assure good flow-out, especially for odd-shaped containers. Solution viscosities below 16 seconds tend to yield a coating with less gloss due to excessive thinness of the coating and above 18 seconds the coating tends to be too heavy.

The other main component of the coating composition is a urea-formaldehyde resin which is used as a curing agent for the epoxy resin. The urea-formaldehyde resin can be characterized by the following formula:

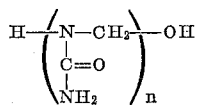

or

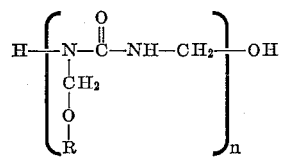

The urea-formaldehyde resin is included in the composition to provide an epoxy/urea formaldehyde ratio in the range between about 1.4/1 and 2.8/1, a ratio of about 2/1 being preferred. Coatings of limited value are produced if the limits indicated above are exceeded. The urea-formaldehyde resin is generally employed in the form of a solution containing about 50–80% of the resin in a solvent such as xylene-butanol. Suitable products include Uformite F–240 (60% solid), Beetle-urea, etc.

An epoxidized fatty acid ester oil of vegetable or animal origin is used as a plasticizer. One part of plasticizer is used per 5 to 12½ parts of the combined weight of the epoxy and urea resins present in the composition, one part of plasticizer per 7½ parts of resin being preferred. As the concentration of plasticizer in the composition decreases within the stated limits, the brittleness of the resulting coating will increase somewhat whereas compositions containing relatively large concentrations of plasticizer will be a little softer. The preferred plasticizer is an epoxidized soybean oil available commercially as "Paraplex G–62" which has a molecular weight of about 1000 and oxirane oxygen content of about 2%. Generally speaking, epoxidized vegetable or animal oils, i.e., glycerides of higher fatty acids, having a molecular weight in the range between about 800–1500 and an oxirane oxygen content of 1% to 5% are suitable.

Another essential ingredient of the novel composition is a phosphate catalyst. 85% phosphoric acid is the preferred catalyst but similar results can be obtained using equivalent amounts of ethyl acid phosphate, dioctyl acid phosphate or generally any phosphate having the formula:

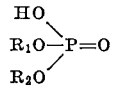

wherein $R_1$ and $R_2$ are the same or different radicals selected from the group consisting of hydrogen and alkyls of 2 to 8 carbon atoms. Aryl phosphates, on the other hand, are much less effective. Somewhat depending on the specific resins employed, the phosphoric acid catalyst is employed in a concentration of about 2–10%, preferably 3–8%, acid or ester calculated as $H_3PO_4$ based on the weight of the epoxy and urea resins present. Catalyst concentrations above the indicated range cause the coating to become increasingly brittle with aging whereas below the indicated range the curing cycle of the composition must be extended beyond 15 minutes at 200° F., which is considered the practical upper limit for the present purposes. Generally speaking, the present invention requires that the coating be converted to a dry and hard cured state by exposing the coated article to a curing temperature in the range of about 175 to 220° F. for a period of about 8 to 20 minutes.

While a wide variety of catalysts such as amines, organic acids and peroxides are known to accelerate the epoxy-urea-formaldehyde curing reaction, only the phosphoric acid type catalysts have been found suitable for purposes of the present invention which requires very short curing and/or drying cycles while allowing the catalyzed coating solution to remain liquid and workable for at least 48 hours. Of course, the tendency of increasing phosphoric acid catalyst concentrations to cause brittleness in the finished coating can be counteracted to some extent by increasing the plasticizer concentration in the coating composition.

In addition, for use in high speed coating operations and especially for coating oddly shaped containers tending to accumulate the coating solution in grooves or on edges, it is desirable to include in the coating composition a small amount of a flow control agent capable of reducing the surface tension of the coating solution. Silicone oils suitable for this purpose can be represented by the formula

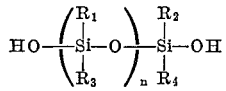

wherein $n$ is an integer ranging from 2 to 10 and $R_1$, $R_2$, $R_3$ and $R_4$ are the same or different radicals of the group consisting of alkyls. For best results, the silicone oil should be one having a viscosity of about 50 to 1000 centistokes and a molecular weight in the range of about 300 to 1000. The silicone oil should be used in a concentration of about 0.1–5% based on the solids content of the composition, concentrations between about 0.3 and 1.5% being preferred.

As it is usually desirable that the glossy coating have anti-static properties so as to minimize dust collection, etc., the coating composition should preferably also include a small amount of an anti-static agent such as a quaternary ammonium chloride corresponding to the following formula:

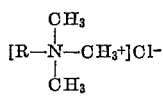

wherein R is an alkyl of about 18 to 20 carbon atoms.

Of all commercially available chemicals currently sold to produce anti-static qualities to plastics and resins, only the quaternary ammonium salts have thus far been found to be of value for use in the present invention. Of these only those based on the higher animal oils such as tallow are effective in trace amounts. Accordingly, these agents are included in the formulation in a concentration of about 0.5–2% passed on solids. They tend to become incompatible with the coating composition at concentrations above the 2% level and are substantially ineffective below the 0.5% level.

The coating compositions are applied to the polyethylene substrate in the form of solutions. Methylethyl ketone is the preferred solvent for making up such solutions. Other known solvents boiling below about 180° F. and capable of dissolving both epoxy resins and urea-formaldehyde resins such as methylisobutyl ketone, methylisoamyl ketone, mixtures of toluene or xylene with MEK or any other mixtures of the foregoing may be used similarly, but are less desirable since their relatively high boiling points tend to slow down the curing cycle of the resin.

The following examples are presented to illustrate the invention but are not intended to be limiting. It should be understood that all proportions of materials are expressed herein on a weight basis unless indicated otherwise.

*Example 1*

100 parts of a commercial bisphenol-type epoxy resin (Bakelite ERL-3794) was admixed with 83.5 parts of a butyrated urea-formaldehyde resin (Uformite F-240) and 20 parts of a saturated epoxidized soybean oil ("Paraplex" G-62).

The epoxy resin had an epoxide equivalent of about 180, a viscosity of about 13,000 centipoises, a Gardner color of 4, and a hydrolyzable chlorine of less than 0.3%. The urea-formaldehyde resin contained 60 parts urea-formaldehyde resin solids by weight in 25 parts by weight of butanol and 16 parts by weight of xylol, had an acid number (solid basis) of about 5, a specific gravity of 1.02 and Gardner-Holdt viscosity L-Q. The epoxidized soybean oil had a molecular weight of about 1000; Gardner color 1; specific gravity 0.999; viscosity about 350 centipoises; refractive index 1.471; acid number less than 1 and a saponification number of 182.

This mixture was then thinned with methylethyl ketone solvent to give a 50% solids concentration and a viscosity of 16–18 sec. on a Zahn #2 cup. 8.5 parts of 85% phosphoric acid were added as a catalyst to the resulting solution. The polyethylene bottle to be coated was then flame treated on all exterior surfaces to assure good adhesion of the coating solution to the bottle substantially as described in Patent 2,632,921 or 2,704,382. The polyethylene surface can be alternatively pretreated by sulfuric acid-dichromate solution (U.S. Reissue Patent 24,062), propane-oxygen explosion treatment or any other suitable treatment which will produce an amount of oxidation on the polyolefin surface sufficient to assure good adhesion of the coating. The bottle was then dipped directly into the coating solution mixed as above, and allowed to drain. The bottle was then dried in a forced air oven at 180–220° F. for 6 to 8 minutes. The resulting coating was hazy, with no gloss whatsoever, and soft as indicated by a hardness below 6B (pencil). Bottles were then sprayed with the same solution producing the same results.

*Example 2*

The same coating solution described in Example 1 was allowed to age at room temperature for 50–70 minutes and bottles were dipped or spray-coated as in Example 1. The viscosity of the coating solution increased slightly from 16.5 to 16.8 sec. Zahn #2 (at 80° F.) during the aging step. Upon drying for 6 to 8 min. at 180–220° F., the resulting coating in this case possessed a very high gloss, and was hard, smooth, clear, and very flexible with excellent adhesion to the treated surfaces of the bottle. The coating also exhibited excellent chemical resistance.

Upon tracking down this striking difference in performance between the fresh and the aged coating solutions, it was found that the slight amount of pre-reaction of the epoxy resin with the urea-formaldehyde resin obtained in the aging step is responsible for the superior performance of the aged coating composition. Based on data from infra-red analysis it appears essential to cause at least 10%, e.g., 10 to 25%, of the available epoxy rings to react before the solution is applied to the bottles. Proper aging may be effected at room temperature, e.g., 60° to 90° F., but higher temperatures up to about 200° F. may be used if faster aging is desired for some unusual reason.

*Example 3*

The same aged solution as in Example 2 was used except that one part of a silicone oil (Dow Corning #710) was added. Dow Corning #710 is a methylpolysiloxane silicone oil having a viscosity of 475 to 525 centistokes, a viscosity temperature-coefficient of 0.83, a flash point of 575° F., a pour point of minus 8° F. and a servicable temperature range of 0 to 500° F. Bottles both dipped and spray coated with this solution were of even better quality than in Example 2 in that they exhibited superior flow preperties while draining due to the surface-tension reduction of the silicone.

*Example 4*

The same aged solution as Example 3 was again used except that 2 parts of an anti-static tallow-based quaternary ammonium chloride complex (Armour "Arquad" 2HT-75) were added. Arquad 2HT-75 has a quaternary ammonium salt content of 74–77%, and a maximum sodium chloride content of 0.5%. Bottles coated with this formulation exhibited excellent anti-static properties when rubbed. All other properties remained as before.

*Example 5*

The aged solution of Example 3 was allowed to further age at room temperatures for 48 hours. The aging increased the viscosity of the solution to 17.8 secs. Zahn #2 after 24 hours and to 19 secs. Zahn #2 (at 80° F.) after 48 hours. The 48-hour aged solution was thinned further with MEK so as to reduce its viscosity to 17.5 secs. Zahn #2. This thinned solution, which had a solids content of 40%, again produced excellent coatings upon spraying and drying as in Example 3. This example shows that the compositions of this invention have a satisfactory pot life for periods of 48 hours or longer, thereby making them suitable for continuous commercial coating operations. Of course, in such continuous operations, the coating solution is continuously being used up and fresh solution is added as make-up. In batch operations this particular solution had a satisfactory pot life for about 24 hours without any thinning and for two days or more with some thinning.

*Example 6*

The solution of Example 5 was allowed to age further at room temperature to a total of 72 hours from addition of catalyst (24 hours longer than in Example 5). Bottles coated from this solution showed good results initially but upon aging at room temperature for 2–4 months the coating became somewhat brittle.

Although the indicated mix may be workable immediately upon addition of the phosphoric acid catalyst and also beyond 48 hours aging at room temperature, the most desirable coating is obtained from a batch having not only a preferred viscosity but also a preferred level of polymerization of the several active components of the formulation. Viscosity alone cannot determine this. A mix which has aged more than 1 hour and less than 48 hours at 70°–90° F. seems to be the most efficient mix.

The mechanical method of applying the coating to the container surfaces are well known to the art and do not constitute a part of the present invention. Specific details of the operation and functioning of spray coating units suitable herefore may be found, for instance, in Patents 2,059,706, 2,069,844 and 2,547,884.

The invention is particularly pointed out in the appended claims.

I claim:

1. A flexible polyethylene bottle having a hard, glossy, adherent surface coating composed of a cured reaction product of about 100 parts of an epichlorhydrin-polyhydric phenol condensate having an epoxide equivalent between about 160 and 200, about 35 to 70 parts of a urea-formaldehyde resin, about 8 to 20% (based on the combined weight of said condensate and urea-formaldehyde resin present) of an epoxidized fatty acid ester oil, about 3 to 8 parts of $H_3PO_4$ (based on the combined weight of said condensate and said urea-formaldehyde resin).

2. A process for applying a hard, glossy coating to a flexible polyethylene bottle which comprises forming a coating solution by dissolving in a ketone solvent having a boiling point between about 150° and 180° F., 100 parts of epichlorhydrin-polyhydric phenol condensate having an epoxide equivalent between 160 and 200, about 35 to 70 parts of a urea-formaldehyde resin, about 8 to 20% (based on the combined weight of said condensate and said urea resin) of an epoxidized fatty acid ester oil having a molecular weight between about 800 and 1500 and an oxirane oxygen content of about 1 to 5%, said solvent being present in an amount sufficient to result in a solution having a viscosity of about 16 to 18 sec. Zahn #2 at 80° F., adding to said solution about 2 to 10 parts of a phosphoric acid compound having the formula

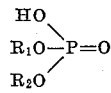

wherein $R_1$ and $R_2$ are members of the group consisting of hydrogen and alkyls of 1 to 8 carbon atoms, aging said solution at a temperature of about 60° F. to 90° F. after inclusion of said phosphoric acid compound therein until at least about 10% and not more than about 25% of the epoxide groups of said condensate are reacted with said urea-formaldehyde resin, applying the thus aged solution to the outer surface of a polyethylene bottle to form a liquid coating thereon, and drying and curing said liquid coating by exposing the resulting coated bottle to a curing temperature of about 175° to 220° F. for a period of about 8 to 20 minutes.

3. A process according to claim 2 wherein the ketone solvent is methyl ethyl ketone and wherein the phosphoric acid compound is $H_3PO_4$.

4. A process according to claim 2 wherein said solution further comprises about 0.5 to 2% (based on total solids) of a quaternary alkyl ammonium chloride containing at least one alkyl group of about 18 to 20 carbon atoms, and about 0.1 to 5% (based on total solids) of a silicone oil having a molecular weight in the range of about 300 to 1000 and a viscosity of about 50 to 1000 centistokes.

References Cited by the Examiner

UNITED STATES PATENTS

| | | | |
|---|---|---|---|
| 2,528,360 | 10/1960 | Greenlee | 260—45.2 |
| 2,626,876 | 1/1953 | Carnes. | |
| 2,703,765 | 3/1955 | Osdal | 260—47 |
| 2,836,319 | 5/1958 | Pinsky et al. | 117—138.8 |
| 3,014,892 | 12/1961 | Schwartzer | 260—834 |
| 3,057,809 | 10/1962 | Newey | 260—18 |

FOREIGN PATENTS 869,969  6/1961  Great Britain.

OTHER REFERENCES

Epoxy Resins, Skeist, Reinhold, New York, 1958 (pages 225–227, 229–30).

Surface Active Agents and Detergents, Schwartz et al., vol. II, pages 268–271.

LEON J. BERCOVITZ, *Primary Examiner.*

JAMES A. SEIDLECK, *Examiner.*

R. W. GRIFFIN, C. W. IVY, *Assistant Examiners.*